United States Patent
Tutikawa

[11] Patent Number: 6,146,074
[45] Date of Patent: *Nov. 14, 2000

[54] WASHER HAVING AN INCLINED PROFILE

[75] Inventor: Yoshiji Tutikawa, Osaka, Japan

[73] Assignee: Daiyasu Metal Industry Co., Ltd., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/024,561

[22] Filed: Feb. 17, 1998

Related U.S. Application Data

[63] Continuation-in-part of application No. 08/865,182, May 29, 1997, abandoned.

[30] Foreign Application Priority Data

Jun. 26, 1996 [JP] Japan ................................... 8-215490

[51] Int. Cl.[7] .................................................. F16B 39/22
[52] U.S. Cl. .......................................... 411/275; 411/230
[58] Field of Search .................................. 411/274, 275, 411/936, 230

[56] References Cited

U.S. PATENT DOCUMENTS

| | | | |
|---|---|---|---|
| 168,021 | 9/1875 | Holton | 411/275 |
| 185,979 | 1/1877 | Sterne | 411/275 |
| 992,137 | 5/1911 | Nowak | 411/275 |
| 3,438,417 | 4/1969 | Albris | 411/936 |

FOREIGN PATENT DOCUMENTS

| | | | |
|---|---|---|---|
| 720782 | 2/1932 | France | 411/275 |
| 395331 | 10/1931 | United Kingdom | 411/275 |

*Primary Examiner*—Flemming Saether
*Attorney, Agent, or Firm*—McDermott, Will & Emery

[57] ABSTRACT

A washer for accommodating the shank of a threaded bolt is formed with at least one slanted opposing face having an angle such that the lower face of a nut, threaded on the bolt, is urged into entire surface contact with the upper face of the washer, while the lower face of the washer is urged into entire surface contact with the upper surface of the article fastened to the bolt. Embodiments include an inclination angle of about 2 degrees to about 2.4 degrees, thereby providing an adequate shearing stress to the shank while concurrently providing a substantially vertical force to the upper face of the article to prevent loosening of the knot.

1 Claim, 2 Drawing Sheets

WASHER HAVING AN INCLINED PROFILE

RELATED APPLICATIONS

This application is a continuation-in-part of application Ser. No. 08/865,182, filed on May 29, 1997 now abandoned. The entire disclosure of application Ser. No. 08/865,182 is hereby incorporated by reference herein in its entirety.

FIELD OF THE INVENTION

The present invention relates to a washer for protecting nuts from loosening and a structure also designed for this purpose.

DESCRIPTION OF PRIOR ART

It has previously been proposed to modify nuts in structure and/or shape to prevent loosening. For example, nut bodies have been made integral with small and plane resilient members formed of a metal or plastic or integral with springs.

Such elastic pieces or springs are typically attached to the nut bodies after machining thereof, thereby complicating manufacturing and increasing production costs. Since such parts increase the torque around the threaded bolt, the nuts suffer from strong resistance even when initially setting them on the bolts. Another disadvantage is that such additional parts gradually deteriorate in elasticity year by year, thereby impairing their anti-loosening effect.

It is also known in the art to slant one of the opposite sides of a so-called plain washer. See, for example, Manfroni, Patent Specification 395, 331 (Great Britain and Diehl, Patent No. 31,908 (German). The slanted side of the washer will cause the nut to take a somewhat inclined position when it is tightened on a bolt, thereby preventing the nut from unintentionally loosening. Such an effect merely relies on stress imparted to the shank of the bolt. The "seat pressure" of the nut bottom face, pressed on and in area contact with the top face of an article to be fastened, is one of the most important factors involved in the mechanism of the loosening phenomenon. No consideration, however, has been given to such seat pressure in the prior art slanted washers. A mere simple shearing stress caused by the inclined nut and imparted to the shank, as with prior art approaches, is not sufficient for perfectly preventing the nut from loosening and, further, may undesirably result in shank breakage.

SUMMARY OF THE INVENTION

A primary object of the present invention is, therefore, an improved washer structure for securely preventing any ordinary nuts from loosening, and capable of being produced at a cost comparable with the production cost of conventional washers.

Another object of the invention is a structure for preventing nuts from loosening, employing the inventive improved washer.

The washer of the present invention for preventing nuts from loosening comprises a washer body having an upper face and a lower face, at least one of the faces being gently slanted at an inclination 'α' relative to the other face so as to provide a seat face. The inventive washer is adapted to accompany the nut when the nut is threaded on the bolt with a prescribed torque so as to fasten an article. It is a significant feature of the present invention that the lower face of the nut is formed so that it comes into forced whole surface contact with the upper face of the washer, and that the lower face of the washer comes into forced whole surface contact with an upper face of the article. This objective is a achieved in embodiments of the present invention by strategically forming the inclination 'a' such that a shearing stress is applied to the shank and, concurrently therewith, a normal pressure is imparted to the upper face of the article.

THE PREFERRED EMBODIMENTS

Figure 1:
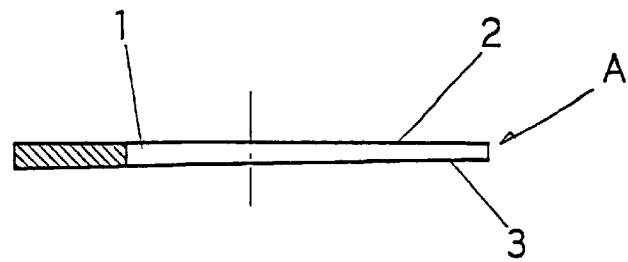
FIG. 1 is a front elevation of a washer for preventing a nut from loosening, the washer being provided in an embodiment and shown partly in cross section.
Figure 2:
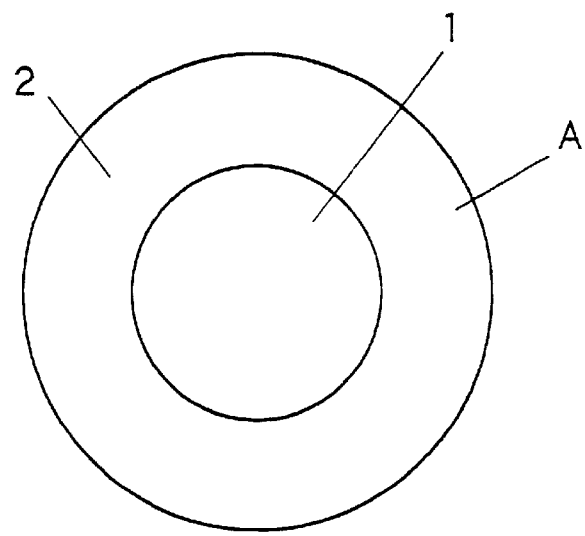
FIG. 2 is a plan view of the water.

In the drawings, the referenced symbol 'A' denotes a washer in accordance with the present invention comprising an annular body 2. The annular body 2 is made of a metal plate, such as an iron plate, and has a central aperture 1 for receiving a bolt's threaded shank. The washer has its bottom face of seat face 3 inclined gently at an angle 'α' towards a diametrical end of the washer body. The angle 'α' of the seat face 3 is strategically designed such that an ordinary nut 'B' accompanied by the washer 'A' can be threaded on a bolt 'D' with a prescribed torque so as to bear against an article 'C' to be fastened with the bolt and nut. The bottom face of the nut 'B' is brought into whole surface contact with the upper face of the washer 'A', with the bottom seat face 3 of the washer also coming, in turn, into whole surface contact with the upper face of the article 'C'. By strategically forming angle 'α' within a particular range, as discussed below, a shearing stress to the bolt shank 'D' is produced concurrently with whole surface contact pressure to the fastened article 'C'. The shearing stress and contact pressure are indicated by arrows in FIG. 4.

The seat angle 'α' mentioned above is determined in a particular situation such that both adequate shearing stress and contact pressure are generated to effectively prevent loosening of a bolt. For example, it has been found that a seat angle 'α' of about 2 degrees to about 2.4 degrees, depending on the size of washer, achieves the objectives of the present invention. The prescribed torque described above may be the same as the standard torque applied to the ordinary nuts, or greater by about 10%. A torque falling within a range of 420–480 kgf.cm is preferable, for example, for the hexagonal metal nuts of the 'M12' class.

Figure 3:
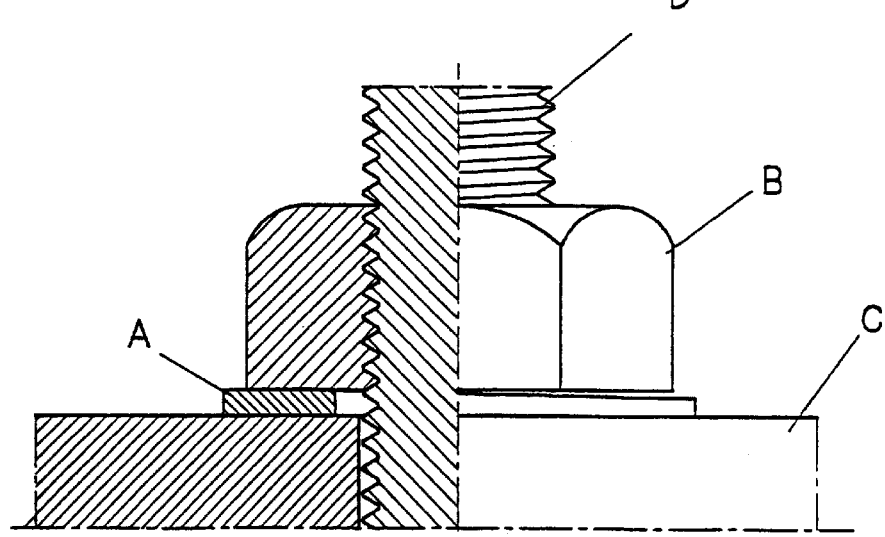
FIG. 3 shows, partly in cross section, the washer that is being pressed between adjacent members.
Figure 4:
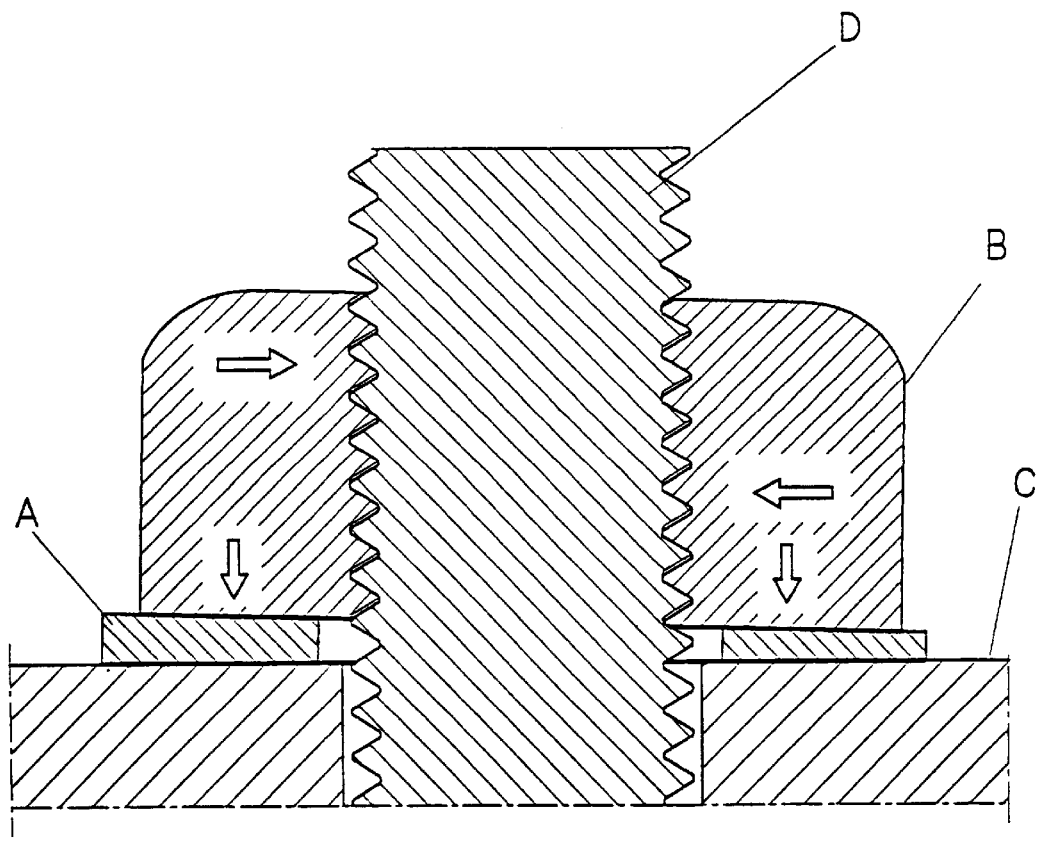
FIG. 4 illustrates the washer also in cross section, but in its completely pressed state and on an enlarged scale.

In use, the washer 'A' cooperates with any conventional standard nut 'B' commercially available, as shown in FIG. 3. Nut 'B' is initially driven around and along the threaded shank of bolt 'D' toward article 'C' to be fastened. After washer 'A' has come into contact with the upper face of article 'C', the nut 'B' is further twisted with a stronger torque to thereby reduce 'play' between the male threads of the bolt and the female threads of the nut. Such additional and forcible driving of nut 'B' causes it to be slanted in its entirety along the slanted seat face of washer 'A', as seen in FIG. 4. At an 'upper' region where the male and female threads meshed and at one of diametrical ends of the nut (where the nut portion is thicker than that located at the other diametrical end), an upper slope of each ridge of the nut's female thread is pressed on a lower slope of each ridge of the shank's male thread. FIG. 4 shows this state, and in a 'lower' region corresponding to the other diametrical thinner end of the nut, a lower slope of each ridge of the nut's female thread is pressed on an upper slope of each ridge of the shank's male thread. As a result, a shearing stress is produced by the thread portions included in the upper and lower regions, respectively. This stress is applied to the shank, as indicated by the horizontal arrows in FIG. 4. On the other hand, the slanted seat face 3 is forced into whole surface contact with the upper face of the fastened article 'C', as indicated by the vertical arrows. The shearing and normal stresses contribute to a firm and permanent engagement of the nut 'B'; with the bolt 'D'. Friction between the lower face of nut 'B' and the upper face of washer 'A', as well as friction between washer 'A' and fastened article 'C', further improves the locked engagement of the members with each other, thus substantially completely hindering the nut 'B' from loosening.

The effects and advantages described above are most eminent in the so-called 'former' nuts, manufactured by cold forging. The former nuts that are made by working a material in a mold are inexpensive but inferior to other types of nuts with respect to the dimensional accuracy of threads, being classified as second class or lower grade nuts. Higher grade nuts produced by cutting do rate first, but are considerably expensive. There is nonnegligible 'lay' or clearance between mating threads when second or third class nuts are used with bolts, so that nuts tend to loosen, even if they have been fastened with a strong torque (see Table 1).

After extensive experiments, it was discovered that an inclination 'α' of about 2 to 2.4 degrees enables the 'former' nuts to be useful, with the 'play' reduced between the threads engaging one with another, thereby advantageously protecting the nuts from loosening due to shearing stress and forced whole surface contact.

Several samples were prepared of an iron washer for use with 'M12' class nuts, wherein each washer had an outer diameter of 26 mm, an inner diameter of 12.2, a maximum thickness of 2.8 mm, a minimum thickness of 1.8 mm and an inclination of 'α' of 2.3 degrees. A public institute called "Kansai JQA Test Center" (a Japanese juridical corporate) was entrusted with vibration loosening testing of such washers. As shown in Table 1, two samples of the 'former' nut loosened within 20 seconds when combined with the conventional plain washer (having an upper and lower faces lying in parallel with other). However, four samples of 'former' nut proved resistant to vibration for 13 minutes or more when combined with the washers prepared in accordance with the present invention. The prescribed standard torque was set at 450 kgf.cm for every sample. The testing apparatus used was a vibrator of the standard 'NAS 3350' enforced in the U.S.A.

TABLE 1

| Samples | Washers | Nuts | Performance |
|---|---|---|---|
| 1 | inclined(*) | 'former' nut | not loosened within 15 min, test finished thereafter |
| 2 | " | " | not loosened within 15 min, test finished thereafter |
| 3 | " | " | not loosened within 15 min, test finished thereafter |
| 4 | " | " | Loosened at 14 min from start |
| 5 | plain (**) | 'former' nut | Loosened at 15 sec from start |
| 6 | " | " | Loosened at 18 sec from start |

Notes:
(*)indicates the washer of the present invention.
(**) indicates the washer of conventional type.

The embodiments described above can be modified without departing from the spirit and scope of the present invention. The washer body may not necessarily have a slanted lower face, but has a slanted upper face, or the upper and lower faces symmetrical with each other are slanted. The washer need not be round, but may have a hexagonal or square shape, affording the same effects and advantages as in the first embodiment.

In summary, the washer body, of the present invention is shaped such that either of or both the upper and lower faces thereof is or are gently inclined at a small angle. Thus, it can be manufactured simply and inexpensively, for use with ordinary nuts, wherein both the shearing stress across the axis of the shank as well as normal pressure to the fastened article are ensured for protection of the nuts from loosening. The washers of the present invention do not hinder the nuts from being easily driven on the bolt shank.

What is claimed is:

1. A structure for protecting a nut from loosening, the structure comprising:

a washer for accompanying the nut when the nut is threaded on a bolt with a prescribed torque so as to fasten an article, the washer comprising an annular washer body having a central aperture for insertion of a shank of the bolt, the washer body having an upper face and a lower face, at least one of the faces being gently slanted at an inclination 'α' relative to the other so as to provide a seat face;

wherein the inclination α is such that, when the nut is threaded on the bolt with the prescribed torque, the lower face of the nut is in forced whole surface contact with the upper face of the washer, the lower face of the washer is in forced whole surface contact with an upper face of the article, and, concurrently therewith, a substantially vertical pressure is imparted to the upper face of the article;

wherein the inclination 'α' is about 2 to about 2.4 degrees.

* * * * *